US007953864B2

(12) United States Patent
Song et al.

(10) Patent No.: US 7,953,864 B2

(45) Date of Patent: May 31, 2011

(54) METHOD AND SYSTEM FOR NOTIFYING UPDATING OF TERMINAL CAPABILITY INFORMATION FOR COMBINATION SERVICE

(75) Inventors: Jae-Seung Song, Seoul (KR); Kyung-Ae Yoon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 542 days.

(21) Appl. No.: 12/089,191

(22) PCT Filed: Aug. 25, 2006

(86) PCT No.: PCT/KR2006/003358

§ 371 (c)(1), (2), (4) Date: Apr. 3, 2008

(87) PCT Pub. No.: WO2007/052887

PCT Pub. Date: May 10, 2007

(65) Prior Publication Data

US 2008/0263210 A1 Oct. 23, 2008

(30) Foreign Application Priority Data

Nov. 22, 2005 (KR) ........................ 10-2005-0112024

(51) Int. Cl.
*G06F 15/16* (2006.01)

(52) U.S. Cl. ........................................ 709/227; 709/228

(58) Field of Classification Search .......... 709/217–219, 709/227–228
See application file for complete search history.

(56) References Cited

U.S. PATENT DOCUMENTS

| | | | | |
|---|---|---|---|---|
| 6,198,923 | B1 | 3/2001 | Buettner | |
| 6,333,739 | B1 * | 12/2001 | Koyama et al. | 715/744 |
| 6,917,800 | B1 | 7/2005 | Rychlak | |
| 7,035,923 | B1 * | 4/2006 | Yoakum et al. | 709/224 |
| 7,305,681 | B2 * | 12/2007 | Khartabil | 719/328 |
| 7,489,900 | B2 * | 2/2009 | Kawakami et al. | 455/41.2 |
| 7,512,118 | B1 * | 3/2009 | Stephens | 370/352 |
| 7,519,715 | B2 * | 4/2009 | Giroir et al. | 709/228 |
| 2006/0270418 | A1 * | 11/2006 | Hannu et al. | 455/455 |

FOREIGN PATENT DOCUMENTS

KR 10-2004-0047099 A 6/2004

* cited by examiner

*Primary Examiner* — Hussein A Elchanti

(74) *Attorney, Agent, or Firm* — Birch, Stewart, Kolasch & Birch, LLP

(57) ABSTRACT

A method and system for notifying updating of terminal capability information for a combination service for simultaneously performing two or more services between first and second users are disclosed. Each terminal recognizes whether or not its terminal capability information has been updated to inform the other terminal accordingly when the first service for the combination service is connected. When a terminal, which has received update indication information informing that the terminal capability information has been updated, request and obtains the updated terminal capability information from the other terminal.

20 Claims, 4 Drawing Sheets

10 FIRST TERMINAL
41 FIRST IMS CORE NETWORK
42 SECOND IMS CORE NETWORK
20 SECOND TERMINAL
OPTIONS (S1)
S2 STORING ADDRESS INFORMATION OF FIRST TERMINAL
200 OK (S3)
(S4) STORING CAPABILITY INFORMATION OF SECOND TERMINAL
S5 DETERMINING TO TRANSMIT OPTION MESSAGE TO FIRST TERMINAL
OPTIONS (S6)
(S7) STORING ADDRESS OF SECOND TERMINAL
200 OK (S8)
S9 STORING CAPABILITY INFORMATION OF FIRST TERMINAL INCLUDED IN RESPONSE MESSAGE

[Fig. 1]
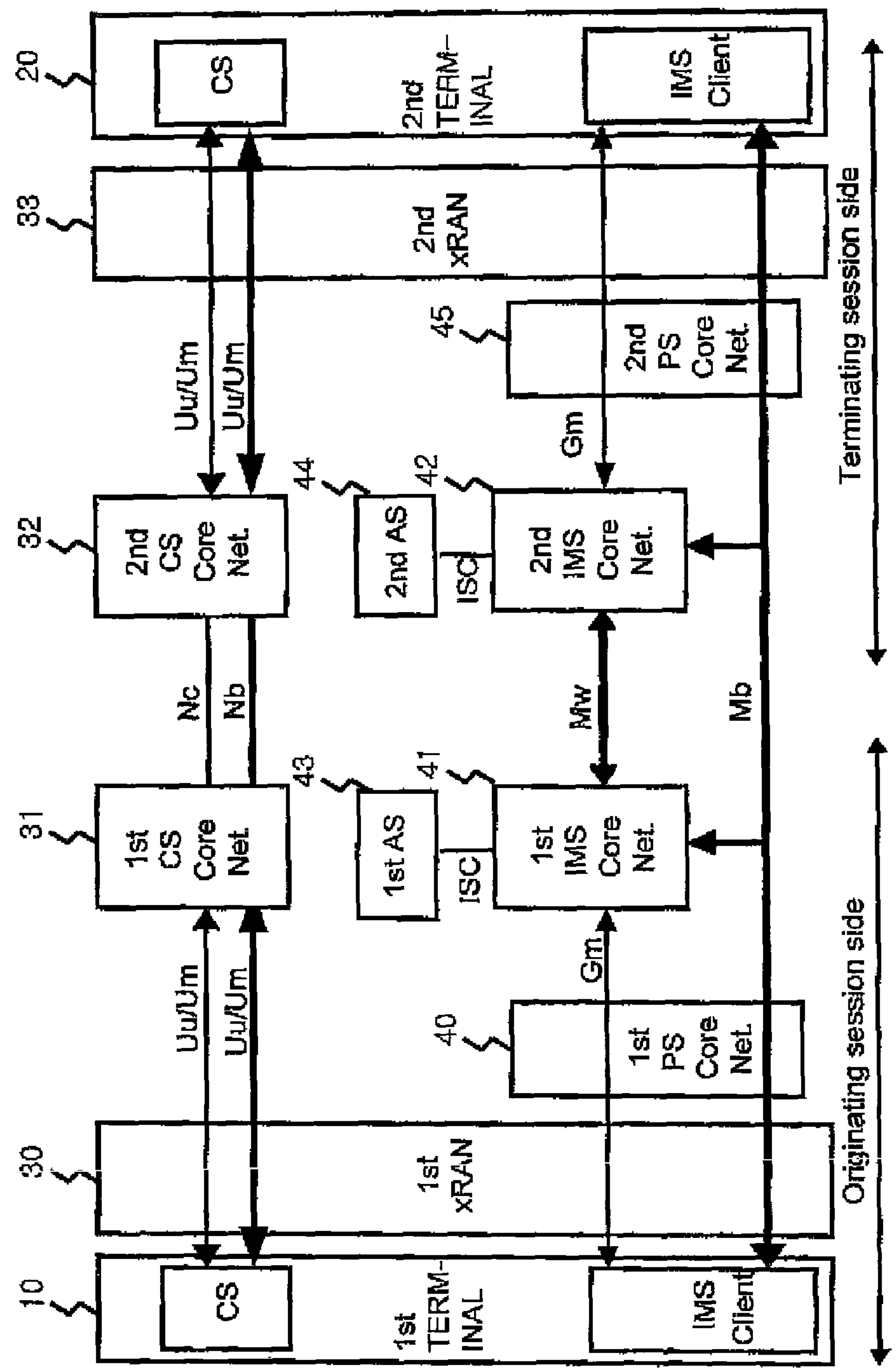

[Fig. 2]
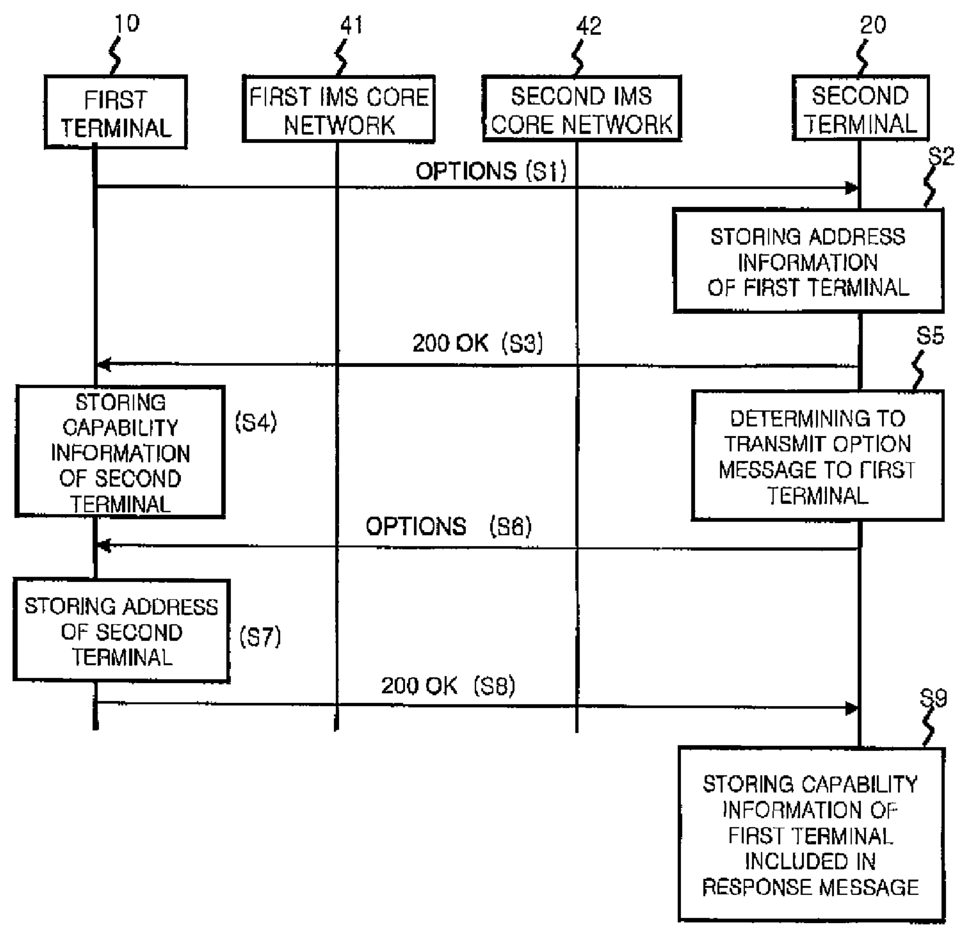

[Fig. 3]
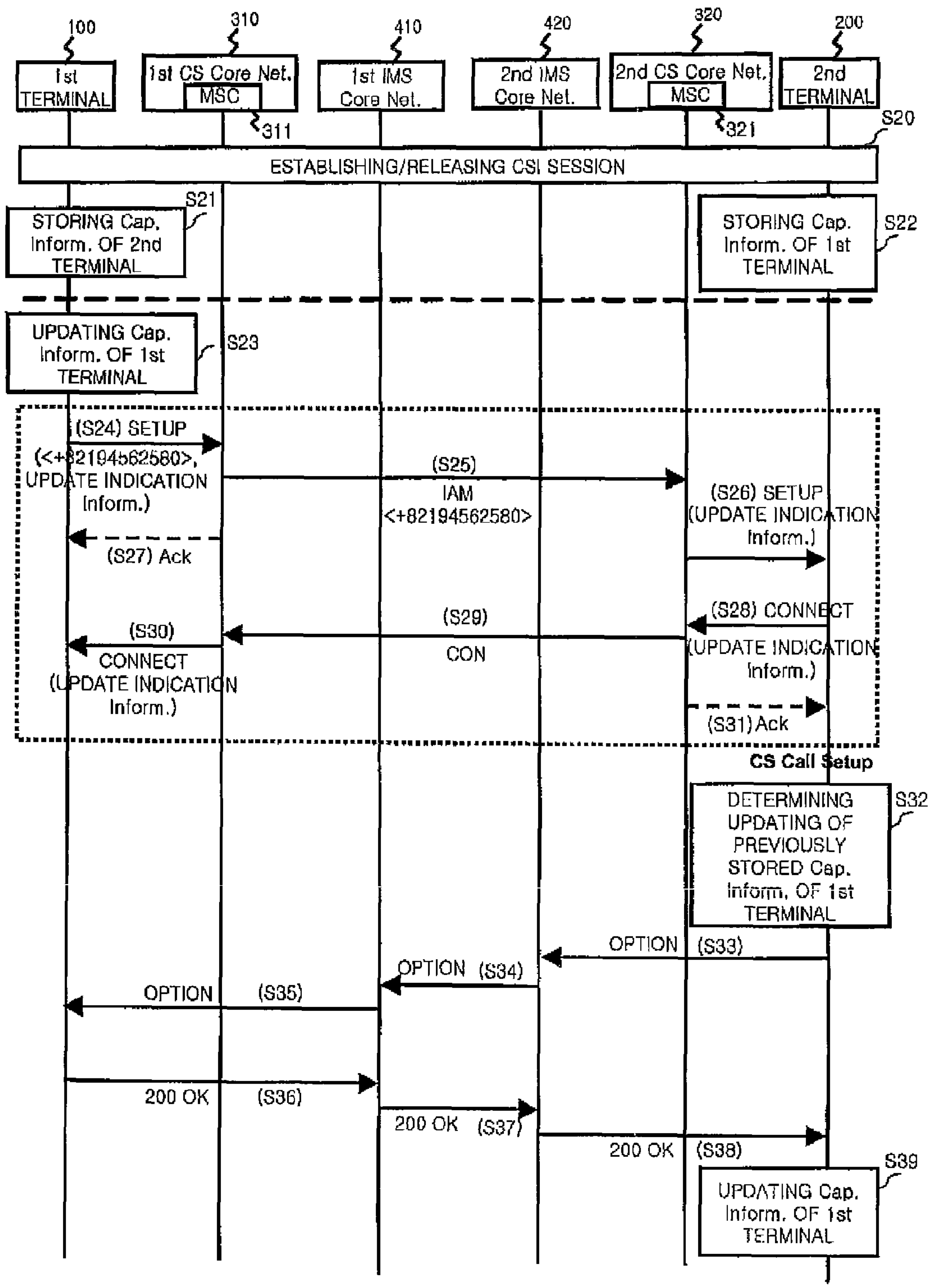

[Fig. 4]

| CAPABILITY INFORMATION VERSION OF FIRST TERMINAL | TERMINAL CAPABILITY INFORMATION VERSION OF SECOND TERMINAL WHEN FIRST AND SECOND TERMINALS WERE PREVIOUSLY CONNECTED FOR SERVICE | TERMINAL CAPABILITY INFORMATION VERSION OF FIRST TERMINAL WHEN FIRST AND SECOND TERMINALS WERE PREVIOUSLY CONNECTED FOR SERVICE |
|---|---|---|
| 1.1 | 2 | 1.1 |
| 2 | | |
| 3.1 | | |
| ⋮ | | |

METHOD AND SYSTEM FOR NOTIFYING UPDATING OF TERMINAL CAPABILITY INFORMATION FOR COMBINATION SERVICE

TECHNICAL FIELD

The present invention relates to a combination service for simultaneously performing two or more services and, more particularly, to a method and system for notifying updating of terminal capability information for a combination service.

BACKGROUND ART

A combination service is a service for simultaneously performing two or more services between first and second users. Also, the combination service is a service for simultaneously performing two or more services between first and second users. Also, the combination service can be a service for combining at least two or more services among a first service based on a first network, a second service based on a second network and a third service based on a third network between the first and second users, and simultaneously performing them.

In order to perform the combination service between the first and second users, the first and second users should recognize information on a service, etc., that can be supported by each other and negotiate services available therebetween.

Herein, a CSI (Combination of CS and IMS services) will be explained as an example of the combination service.

The CSI is a service for combining a CS (Circuit Switched) service and an IMS (IP Multimedia Subsystem) service and simultaneously performing them between the first and second users. An IMS session for the IMS service can be added to a CS call established between the first and second users, or conversely, the CS call can be added to the IMS session established between the first and second users. The IMS service that can be added to the CS call which has been already established between the first and second users may include IMS-based services such as an instant messaging (IM), video sharing, a data delivery, etc.

FIG. 1 shows a network configuration for providing a general combination service, for example, a CSI, between the first and second terminals. As shown in FIG. 1, the network for providing the general combination service, e.g., the CSI, includes first and second CS core networks 31 and 32 for supporting a CS service for the CSI between the first and second terminals 10 and 20; first and second IMS core networks 41 and 42 for supporting an IMS service for the CSI to the first and second terminals 10 and 20; a first application server (AS) 43 connected with the first IMS core network 41 and performing a particular function of the IMS session of the CSI, e.g., a service-based charging function, of the IMS session of the CSI of the first terminal 10; a second server 44 connected with the second IMS core network 42 and performing a particular function (E.G., a service-based charging function) of the IMS session of the CSI of the second terminal 20; a radio access network (xRAN) 30 for connecting the first terminal 10 to the first CS core network 31 and the first IMS core network 41; and a second radio access network (xRAN) 33 for connecting the second terminal 20 to the second CS core network 32 and the second IMS core network 42.

The network for providing the CSI additionally includes a first PS (Packet Switched) core network 40 connected between the first xRAN 30 and the first IMS core network 41 to establish an IMS session of the CSI; and a second PS core network 45 connected between the second x-RAN 30 and the second IMS core network 42 to establish the IMS session of the CSI.

The first and second CS core networks 31 and 32 include an MSC (Mobile Switching Center), a VLR (Visiting Location Register) and an HLR (home Location Register), respectively.

The general CSI providing method in the general network for providing the CSI will now be described.

In case of the CS call between the first and second terminals 10 and 20, data and a control signal are exchanged through the first and second core networks 31 and 32, and in case of the IMS session, data and a control signal are exchanged through the first PS core network 40, the first IMS core network 41, the second IMS core network 42 and the second PS core network 45.

The first terminal 10 includes a function for being simultaneously connected to the first CS core network 31 and the first PS core network 40, and the second terminal 20 includes a function for being simultaneously connected to the second CS core network 32 and the second PS core network 45.

Before the CSI service starts between the first and second terminals 10 and 20, the first and second terminals 10 and 20 exchange their radio environment information of the current terminals and terminal capability information to recognize information about services that can be supported by each other.

The current radio environment information of the terminals 10 and 20 is used as important information for a user to determine a behavior after the CS call is established. Namely, the user can determine whether to exchange the terminal capability information or start the IMS session according to the current radio environment information.

The radio environment information is exchanged through a CS domain while the CS call is being established. The radio environment information is flexible and may differ according to an environment when the CS call is established, so the exchanged radio environment information is used as valid information only during duration of the CS call.

The radio environment information includes information indicating whether the terminals support the simultaneous using of the CS service and the PS service, etc. The terminal capability information is exchanged through an IMS domain.

FIG. 2 shows a general method for exchanging the terminal capability information between the first and second terminals.

In order to request the capability information of the second terminal, the first terminal 10 transmits an SIP (Session Initiation Protocol) OPTIONS message to the second terminal 20 (step S1). Then, the second terminal 20 stores address information of the first terminal 10 included in the SIP OPTIONS message (step S2) and transmits a 200 OK message in response to the SIP OPTIONS message. The 200 OK message includes the capability information of the second terminal 20 (step S3).

Upon receiving the 200 OK message, the first terminal 10 stores the capability information of the second terminal 20 included in the 200 OK message (step S4).

Meanwhile, after receiving the SIP OPTIONS message from the first terminal 10, if the second terminal 20 has not transmitted SIP OPTIONS message for requesting terminal capability information to the first terminal 10, the second terminal 20 determines to transmit the SIP OPTIONS message to the first terminal 10 to request the capability information of the first terminal 10 (step S5). When the SIP OPTIONS message that requests the capability information of the first terminal 10 is received from the second terminal 20, the first terminal 10 stores address information of the second terminal 20 included in the SIP OPTIONS message (step S7) and transmits a 200 OK message as a response message to the second terminal 20 (step S8). The 200 OK message includes the capability information of the first terminal 10.

The second terminal 20 stores the capability information of the first terminal 10 included in the 200 OK message transmitted from the first terminal 10 (step S9).

In this manner, the capability information of the first and second terminals 10 and 20 exchanged between the first and second terminals are stored in the first and second terminals 10 and 20 to quickly set a service and reduce a network load for communications later.

Accordingly, in order for a particular terminal to obtain capability information of the other terminal, it should transmit the SIP OPTIONS message for requesting terminal capability information to the other terminal and receive a response message including capability information of capability information of the other terminal from the other terminal.

The general terminal capability information exchanging method in the CSI providing network, respective terminals transmit the SIP OPTIONS message to the other terminal to obtain the capability information of the other terminal and store them.

Meanwhile, in a state the first and second terminals have performed the combination service, recognize terminal capability information of mutually other terminals and store them in respective caches, when the first and second terminal want to perform the combination service, namely, the CSI, again, the first and second terminals establish the IMS session for the CSI. And then, the first and second terminals check that the terminal capability information of the other terminal has been stored in a local area, namely, in the cache, and perform an INVITE message transmission procedure for an IMS session connection, without performing the terminal capability information exchange procedure.

In this case, if the terminal capability information of at least one of the first and second terminals has been updated, the terminal capability information stored in the cache of respective terminals and the actual terminal capability information are not the same, the IMS session connection by the INVITE message would be failed. Thus, as the IMS session connection is failed, the first and second terminal perform the capability exchange procedure and then perform the INVITE message transmission/reception procedure for the IMS session connection.

Therefore, the general terminal capability information exchanging method has the following problem.

That is, even when the terminal capability information stored in the cache of each terminal is different from the actual terminal capability information, the IMS session connection procedure is performed by using the INVITE message based on the terminal capability information of the other terminal stored in their cache. Thus, the performing of the unnecessary INVITE message transmission/reception procedure causes a waste of the network signaling and network resources.

In addition, even when only the terminal capability information of one terminal is changed, not that the terminal capability information of both terminals are not changed, the terminal capability information are exchanged between both terminals.

That is, in the general terminal capability information exchanging method, when the terminal capability information of the first terminal is changed while that of the second terminal is not changed, the first terminal transmits the SIP OPTIONS MESSAGE to the second terminal to receive the terminal capability information of the second terminal, and the second terminal transmits the SIP OPTIONS message to the first terminal to receive the terminal capability information of the first terminal. Thus, the unnecessary procedure, namely, the procedure of requesting and obtaining the terminal capability information of the other terminal which has not been changed, is performed disadvantageously.

Because the unnecessary procedure is performed, the network signaling and network resources are wasted.

Also, there is no way for the particular terminal whose terminal capability information has been changed to inform the other terminal that the change in its terminal capability information.

DISCLOSURE OF INVENTION

Technical Solution

One exemplary feature of the present invention is to provide a method and system for notifying updating of terminal capability information for a combination service capable of simplifying a procedure for exchanging terminal capability information for a combination service.

To implement at least the above feature in whole or in parts, the present invention provides a method for notifying updating of terminal capability information for a combination service in simultaneously performing two different services between at least two or more terminals, including: receiving a connection request message including first update indication information of an origination terminal; and selectively performing, by a reception terminal, a procedure for establishing a service connection with the origination terminal and a procedure for checking terminal capability information with the origination terminal according to the first update indication information included in the connection request message.

To implement at least the above feature in whole or in parts, the present invention also provides a method for notifying updating of terminal capability information for a combination service in a combination service for simultaneously performing at least first and second services between at least two or more terminals, including: checking whether terminal capability information of an origination terminal has been updated, and determining whether to add first update indication information to a connection request message for a first service; transmitting, by the origination terminal, the connection request message to a reception terminal; and selectively performing, by the reception terminal, a procedure for establishing a second service connection with the origination terminal or a procedure for checking terminal capability information with the origination terminal according to existence or non-existence of the first update indication information in the connection request message.

To implement at least the above feature in whole or in parts, the present invention also provides a method for notifying updating of terminal capability information for a combination service in performing a CSI by an origination terminal and a reception terminal, including: transmitting, by the origination terminal, a connection request message including first update indication information; transmitting, by the reception terminal, a connection response message including second update indication information; selectively performing, by the reception terminal, a procedure for checking terminal capability information of the origination terminal according to the first update indication information included in the connection request message; selectively performing, by the origination terminal, a procedure for checking terminal capability information with the reception terminal according to the second update indication information included in the connection response message; and performing, by the origination terminal, a procedure for establishing an IMS session of the CSI.

To implement at least the above feature in whole or in parts, the present invention also provides a terminal for notifying updating of terminal capability information for a combination service in a combination service for simultaneously performing at least first and second services between first and second terminals, including: a memory for storing its current terminal capability information, its terminal capability information when its terminal was previously connected with the other terminal for the combination service and terminal capability information of the other terminal; and a processor for checking its current terminal capability information and its terminal capability information when its terminal was previously connected for the service and transmitting a connection request message including first update indication information to the other terminal, and selectively performing a procedure for requesting terminal capability information of the other terminal and a procedure for connecting a service with the other terminal according to second update indication information included in a connection response message transferred from the other terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DESCRIPTION OF DRAWINGS

The invention will be described in detail with reference to the following drawings in which like reference numerals refer to like elements wherein:

FIG. 1 is a view showing a network configuration for providing a general combination service between first and second terminals;

FIG. 2 is a view showing a general method for exchanging terminal capability information between the first and second terminals;

FIG. 3 is a view showing a method for notifying updating of terminal capability information for a combination service according to an exemplary embodiment of the present invention; and FIG. 4 shows a table for recognizing whether or not terminal capability information of a particular terminal has been updated according to the exemplary embodiment of the present invention.

MODE FOR INVENTION

A method and system for notifying updating of terminal capability information for a combination service according to the exemplary embodiment of the present invention will be described with reference to the accompanying drawings.

In the exemplary embodiment of the present invention, in a combination service for simultaneously performing two or more services between first and second users, when a first service for the combination service is connected, each terminal recognizes whether its terminal capability information has been updated and informs the other terminal accordingly. A terminal, which has received the update indication information indicating that terminal capability information has been updated, requests and receives the updated terminal capability information from the other terminal.

FIG. 3 is a view showing a method and system for notifying updating of terminal capability information for a combination service according to an exemplary embodiment of the present invention. As shown in FIG. 3, the system for notifying updating of terminal capability information includes first and second terminals 100 and 200 for recognizing whether or not its terminal capability information has been updated and informing the other terminal accordingly, and requesting and receiving updated terminal capability information from the other terminal when receiving update indication information indicating that terminal capability information has been received, in connecting a first service to perform a combination service including at least first and second services.

The system for notifying updating of the terminal capability information further includes a first service network for providing the first service to the first and second terminals 100 and 200; and a second service network for providing the second service to the first and second terminals 100 and 200.

The first and second terminals 100 and 200 includes a memory (not shown) for storing their current terminal capability information and their terminal capability information when a service has been previously connected with the other terminal; and a processor (not shown) for determining whether their current terminal capability information has been updated by comparing their current terminal capability information and their terminal capability information for the previous service and transmitting update indication information indicating whether their current terminal capability has been updated to the other terminal in connecting the first service, respectively.

The memory further includes address information of the terminal, terminal capability information and address information of the other terminal in the previous service connection. The memory can be a database.

The current terminal capability information of the terminal, the address information of the terminal, terminal capability information of the terminal in the previous service connection, the terminal capability information of the other terminal in the previous service connection can be stored in a cache or can be stored in a form of a table in a local area.

The first and second terminals 100 and 200 may simultaneously perform two or more services of the combination service.

For example, when the combination service is a CSI (combination of CS and IMS services), the first service can be a CS (Circuit Switched) service and the second service can be an IMS (IP Multimedia Subsystem) service. Also, the first service network can be first and second CS core networks 310 and 320 for providing the CS service to the first and second terminals 100 and 200, and the second service network can be first and second IMS core networks 310 and 320 for providing an IMS service to the first and second terminals 100 and 200.

The first and second CS core networks 310 and 320 include MSCs (Mobile Switching Centers) 311 and 321, respectively, and may include a VLR (not shown) and an HLR (not shown).

The first terminal 100 is simultaneously connected with the first and second service networks through a first wireless access network (not shown). The second terminal 200 is simultaneously connected with the first and second service networks through a second wireless access network (not shown).

In case of the IMS service, the second service includes a first packet service (PS) core network (not shown) network positioned between the first IMS core network 410 and the first wireless access network and providing an IMS session path to the first terminal 100; and a second PS core network (not shown) positioned between the second IMS core network 420 and the second wireless access network and providing an IMS session path to the second terminal 200.

The first and second IMS core networks 410 and 420 include a first application server (AS) (not shown) and a second application server (not shown), respectively.

The operation of the system for notifying updating of terminal capability information for a combination service according to the present invention will now be described in detail.

An origination terminal (caller terminal) and a reception terminal (callee terminal) perform the combination service and then releases the connection of the combination service. For example, assuming that the origination terminal is the first terminal 100 and the reception terminal is the second terminal 200, the first and second terminals 100 and 200 perform data exchange and call communication through the CSI which si-multaneously uses a CS call and an IMS service by integrating them, and release the CSI session (step S20). When the CSI, e.g., a video call service, is performed, an image may go by way of an IMS domain (or IMS bearer), namely, the first and second IMS core networks 410 and 420, and a voice may go by way of a CS domain (or CS bearer), namely, the first and second CS core networks 310 and 320.

The terminal capability information and a public user identity (ID) of the first terminal 100 which have been exchanged between the first and second terminals 100 and 200 in the CSI setup process are stored in a cache of the second terminal 200, and the terminal capability information and a public user ID of the second terminal 200 are stored in a cache of the first terminal 200 (steps S21 and S22). The information stored in respective caches of the first and second terminals 100 and 200 are used when the first and second terminals 100 and 200 perform the CSI service again later.

FIG. 4 shows a table for managing terminal capability information stored in the memory (or cache or local area) of a particular terminal, which is used to determine whether there is a difference between terminal capability information of a particular terminal which has been exchanged with the other terminal in a previous service connection and current terminal capability information of the particular terminal. The terminal capability information management table is stored for each terminal and manages terminal capability information (or terminal capability information versions) of the other terminals to which each terminal was connected for the combination service.

After the particular terminal performs the CSI with the other terminal, the terminal capability information of the particular terminal may be changed. The terminal capability information can be changed (updated), first, when IMS services such as a PoC service, an IM (Instant Messaging) service, an IMS-based video sharing service, an IMS-based data transmission service or broadcast are registered to or deregistered, second, when a multimedia equipment such as a camera is dynamically mounted to or dismounted from the terminal, third, when a new codec or a supporable file format is corrected by using a download service, and fourth, a version of an MMS service is updated.

When the terminal capability information of the particular terminal is changed (updated), the particular terminal detects it and updates the version of the terminal capability information. And then, the particular terminal stores the changed terminal capability information and the updated version in its terminal capability information management table as shown in FIG. 4 (step S23). The version of the terminal capability information is a unique value.

The particular terminal recognizes its terminal capability information (or the version of its terminal capability information) which was previously exchanged with the other terminal for the combination service and its current terminal capability information (or the current version of its terminal capability information), with reference to its terminal capability information management table. If the current terminal capability information of the particular terminal and the terminal capability information of the particular terminal in the previous service connection are different, the particular terminal determines that its current terminal capability information has been updated.

For example, when the terminal capability information of the first terminal 100 is changed, the first terminal 100 may check that its current terminal capability information version and terminal capability information version for the previous service are not identical with reference to the first table (terminal capability information management table) stored in its cache.

The case where the first terminal 100 performs a CS call setup procedure to perform the CSI service again with the second terminal 200 will be explained as an example.

The first terminal 100 checks whether the information of the second terminal 200, namely, the address information (public user ID) and the terminal capability information of the second terminal 200 has been stored in its cache. When the information of the second terminal 200 has been stored, the first terminal 100 recognizes that it had previously performed the CSI service with the second terminal. Subsequently, the first terminal 100 searches terminal capability information version of the first terminal 200 in the previous service connection with the second terminal 200 from the first table (terminal capability information management table) stored in its cache, and then, compares its current terminal capability information version and the terminal capability information version in the previous service connection with the second terminal 200.

When the current terminal capability information version of the first terminal 100 and the terminal capability information version of the first terminal 100 in the previous service are different, the first terminal 100 includes first update indication information for informing that the terminal capability information of the first terminal 100 has been updated in a connection request message, e.g., a SETUP message, for requesting the CS call setup, and transmits it to the first CS core network 310 (step S24). The SETUP message include address information of the second terminal 200.

If, however, the current terminal capability information version and the terminal capability information version in the previous service are identical, the first terminal 100 determines that its terminal capability information has not been updated, includes first update indication information for informing that its terminal capability information has not been updated in the SETUP message and transmits it to the first CS core network 310 (step S24).

The first update indication information includes one of certain data for indicating whether or not the terminal capability information of the first terminal 100 has been updated and a parameter for indicating whether or not the terminal capability information of the first terminal 100 has been updated. The certain data can be bit data. For example, '1' is to inform that the terminal capability information has been updated and '0' is to inform that terminal capability information has not been updated. In addition, in order to inform that the terminal capability information has been updated, a 'TRUE' value can be used, and in order to inform that the terminal capability information has not been update, a 'FALSE' value can be used.

In order to inform that its current terminal capability information has been updated, the first terminal 100 can add the first update indication information in the SETUP message and transmit it, and in order to inform that its current terminal capability information has not bee updated, the first terminal 100 may not add the first update indication information in the SETUP message.

The MSC 311 of the first CS core network 310 converts the received SETUP message into an IAM (Initial Address Message), a call setup message used in a signaling network system, e.g., in an SS7 (Signaling System 7). And then, the MSC 311 transmits the IAM message to the second CS core network 320 to which the second terminal 200 belongs by using the address information, e.g., a phone number, of the second terminal 200 (step S25). Herein, the MSC 311 of the first CS core network 310 may transmit an acknowledge message with respect to the SETUP message to the first terminal 100 (step S27). The MSC 321 of the second CS core network 320 converts the LAM message into the SETUP message and transmits it to the second terminal 200 (step S26).

The second terminal 200 a CONNECT message, a connection response message, in response to the SETUP message (step S28). The CONNECT message includes the second update indication information for informing whether or not the terminal capability information of the second terminal 200 has been updated. In this case, the second terminal 200 determines whether or not its terminal capability information has been updated with reference to the second table (terminal capability information management table) similar to the table as shown in FIG. 4 stored in the cache of the second terminal.

That is, the second terminal 200 searches its terminal capability information version in the previous service connection with the first terminal 100 from the second table, and compares its terminal capability information version in the previous service and its current terminal capability information.

When the current terminal capability information version and the terminal capability information version in the previous service are identical, the second terminal 200 includes the second update indication information informing that its terminal capability information has not been updated in the CONNECT message and transmits it.

If, however, the current terminal capability information version of the second terminal 200 and the terminal capability information version of the second terminal 200 in the previous service are not identical, the second terminal 200 includes the second update indication information informing that its terminal capability information has been updated in the CONNECT message and transmits it. Herein, the second update indication information for informing that the terminal capability information of the second terminal 200 has not been updated and the second update indication information for informing that the terminal capability information of the second terminal has been updated have each different value.

Meanwhile, in order to inform that its terminal capability information has not been updated, the second terminal 200 may transmit the CONNECT message that does not include the second update indication information, or in order to inform that its terminal capability information has been updated, the second terminal 200 may transmit the CONNECT message that includes the second update indication information.

The CONNECT message is transmitted to the MSC 321 of the second CS core network 320, and the MSC 321 converts the CONNECT message into a CON message, a connect message of an SS7 protocol. And then, the MSC 321 transmits the CON message to the MSC 311 of the first CS core network 310 to which the first terminal 100 belongs (step S29). Herein, the MSC 321 of the second CS core network 320 may transmit an acknowledge message with reference to the CONNECT message to the second terminal 200 (step S31).

The MSC 311 of the first CS core network 310 converts the received CON message into the CONNECT message and transfers it to the first terminal 100 (step S30).

In this manner, when the CS call is connected between the first and second terminals 100 and 200, the first and second terminals 100 and 200 include the update indication information for informing whether or not their terminal capability information has been updated in the connection request message (SETUP message) and the connection response message (CONNECT message) and transmit it, respectively, whereby the first and second terminals 100 and 200 can inform whether or not their terminal capability information has been updated to the other terminal.

Accordingly, the first and second terminals 100 and 200 check the SETUP message or the CONNECT message received in the CS call connection stage to check whether or not the terminal capability information of the other terminal has been updated. Thus before starting the IMS session establishment procedure for the CSI (while preparing the IMS session establishment), the first and second terminals 100 and 200 determine whether to request and receive the terminal capability information of the other terminal.

Upon checking the SETUP message by the second terminal 200, if the first update indication information included in the SETUP message indicates that the terminal capability information of the first terminal 100 has not bee updated, and upon checking the CONNECT message by the first terminal 100, if the second update indication information included in the CONNECT message indicates that the terminal capability information of the second terminal 200 has not been updated, the first and second terminals 100 and 200 start establishment of the IMS session based on the terminal capability information of the other terminal stored in each cache, without performing the terminal capability information exchange procedure. Namely, the first terminal 100 generates a message (e.g., an INVITE message) for requesting establishment of the IMS session by using the terminal capability information and the public user ID of the second terminal 200 stored in its cache, and transmits it to the second terminal 200.

Meanwhile, if the SETUP message received by the second terminal 200 does not include the first update indication information for indicating that the terminal capability information of the first terminal 100 has been updated, and if the CONNECT message received by the first terminal 100 does not include the second update indication information for indicating that the terminal capability information of the second terminal 200 has been updated, the first and second terminals 100 and 200 start establishing of the IMS session without performing the terminal capability information exchange procedure.

If, however, the second indication information included in the CONNECT message indicates that the terminal capability information of the second terminal 200 has been updated or if the CONNECT message includes the second update indication information, the first terminal 100 determines that the terminal capability information of the second terminal 200 has been updated and transmits an SIP OPTIONS message for requesting the updated terminal capability information of the second terminal 200 to the second terminal 200 (not shown). Upon receiving the SIP OPTIONS message through the first and second IMS core networks 410 and 420, the second terminal 200 transmits a response message (e.g., 200 OK message) with respect to the SIP OPTIONS message to the first terminal 100. The 200 OK message includes the updated terminal capability information of the second terminal 200.

If the first update indication information included in the SETUP message indicates that the terminal capability information of the first terminal 100 has been updated or if the SETUP message includes the first update indication information, the second terminal 200 determines that the terminal capability information of the first terminal 1100 has been updated, and performs a procedure for requesting and obtaining the updated terminal capability information of the first terminal. Namely, the second terminal transmits the SIP OPTIONS message for requesting the changed capability information of the first terminal 100 (step S33).

The SIP OPTIONS message is transmitted to the first terminal 100 through the second and first IMS core networks 420 and 410 (steps S34 and S35).

The first terminal 100 transmits a response message (200 OK message) with respect to the SIP OPTIONS message (step S36). The 200 OK message includes at least the updated terminal capability information of the first terminal 100. The 200 OK message is transmitted to the second terminal 200 through the first and second IMS core networks 410 and 420 (steps S37 and S38).

The second terminal stores the updated terminal capability information of the first terminal 100 included in the 200 OK message in its cache (step S39).

In this manner, when the actual terminal capability information of the first and second terminals 100 and 200 and the terminal capability information of the other terminal stored in each cache are identical, the first terminal 100 transmits a message for requesting establishment of the IMS session with the second terminal 200, namely, an INVITE message, to the second terminal 200. Accordingly, the CS call and the IMS session are simultaneously connected between the first and second terminals 100 and 200, so that the first and second terminals 100 and 200 can perform the CSI.

When a general CS call connection procedure is performed between the first and second terminals 100 and 200, after the CS call is connected, the first and second terminals 100 and 200 cannot know whether or not the terminal capability information of the other terminal has been updated. Thus, the first terminal 100 immediately generates the INVITE message for requesting establishment of the IMS session based on the terminal capability information of the other terminal (terminal capability information of the second terminal 200) stored in its cache, and transmits it. In this case, if the terminal capability information of the second terminal 200 has been updated, the establishment of the IMS session by the INVITE message would be failed, causing a problem that the first and second terminals 100 and 200 must start the terminal capability information exchange procedure again and thus network resources are wasted.

However, in the present invention, because the first and second terminals 100 and 200 inform whether or not their terminal capability information has been updated through the SETUP message and the CONNECT message when connecting the CS call, the first and second terminals 100 and 200 can easily recognize whether or not the terminal capability information of the other terminal has been updated at the time point when the CS call is connected therebetween.

As so far described, the method and system for notifying updating of the terminal capability information for the combination service according to the present invention have many advantages.

That is, for example, when the terminals recognize whether or not their terminal capability information has been updated and connect the first service for the combination service, they can inform the other terminal whether or not their terminal capability information has been updated.

Also, because the terminal, which has received the update indication information indicating that the terminal capability information has been updated, can request and receive the updated terminal capability information of the other terminal, the terminal capability information exchange procedure can be simplified.

In addition, by omitting the unnecessary terminal capability information exchange procedure, a waste of the network resources can be prevented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for notifying updating of terminal capability information for a combination service in simultaneously performing two different services between at least two or more terminals, comprising:

receiving a connection request message including first update indication information of an origination terminal;

selectively performing, by a reception terminal, a procedure for establishing a service connection with the origination terminal and a procedure for checking terminal capability information with the origination terminal according to the first update indication information included in the connection request message;

receiving a connection response message including second update indication information of the reception terminal; and selectively performing, by the origination terminal, the service connection setting procedure with the reception terminal and the terminal capability information checking procedure according to the second update indication information included in the connection response message.

2. The method of claim 1, wherein if the first update indication information included in the connection request message indicates that the terminal capability information of the origination terminal has been updated, the reception terminal performs a procedure for checking a terminal capability information with the origination terminal.

3. The method of claim 2, wherein the terminal capability information checking procedure comprises: transmitting, by the reception terminal, an OPTIONS message for requesting the terminal capability information of the origination terminal; and adding, by the origination terminal, its terminal capability information in a response message and transmitting the response message to the reception terminal.

4. The method of claim 1, wherein when the first update indication information included in the connection request message indicates that the terminal capability information of the origination terminal has not been updated, the reception terminal performs a procedure for setting a service connection with the origination terminal.

5. The method of claim 4, wherein the service connection setting procedure is a procedure for establishing a session of a different service between the origination terminal and the reception terminal.

6. The method of claim 1, wherein the first update indication information indicates that the terminal capability information of the origination terminal is different from terminal capability information of the origination terminal in a previous service connection with the reception terminal.

7. The method of claim 1, wherein the reception terminal selectively performs the service connection setting procedure with the origination terminal and the terminal capability information checking procedure with the origination terminal according to the value of the first update indication information included in the connection request message.

8. The method of claim 7, wherein the origination terminal determines the value of the first update indication information by comparing its terminal capability information in the previous service connection with the reception terminal stored in a first terminal capability information management table and its current terminal capability information.

9. The method of claim 1, wherein when the second update indication information included in the connection response message indicates that the terminal capability information of the reception terminal has been updated, the origination terminal performs the terminal capability information checking procedure with the reception terminal.

10. The method of claim 9, wherein the terminal capability information checking procedure comprises: transmitting, by the origination terminal, an OPTIONS message for requesting the terminal capability information of the reception terminal; and adding, by the reception terminal, its terminal capability information in a response message, and transmitting the response message.

11. The method of claim 1, wherein when the second update indication information included in the connection response message indicates that the terminal capability information of the reception terminal has not been updated, the origination terminal performs the service connection setting procedure with the reception terminal, wherein the service connection setting procedure is a procedure for establishing a session of a different service between the origination terminal and the reception terminal.

12. The method of claim 1, wherein the second update indication information indicates that the terminal capability information of the reception terminal is different from terminal capability information of the reception terminal in the previous service connection with the origination terminal 13. The method of claim 1, wherein the origination terminal selectively performs the service connection setting procedure with the reception terminal and the terminal capability information checking procedure with the reception terminal according to the value of the second update indication information included in the connection response message.

14. The method of claim 13, wherein the reception terminal determines the value of the second update indication information by comparing its terminal capability information in the previous service connection with the origination terminal as stored in a second terminal capability information management table and its current terminal capability information.

15. The method of claim 13, wherein the reception terminal determines the value of the second update indication information by comparing its terminal capability information version in the previous service connection with the origination terminal stored in the second terminal capability information management table and its current terminal capability information version.

16. The method of claim 1, wherein one of the difference services includes a CS (Circuit Switched) call service and the other includes an IMS (IP Multimedia Subsystem) service.

17. A method for notifying updating of terminal capability information for a combination service in a combination service for simultaneously performing at least first and second services between at least two or more terminals, comprising:

checking whether terminal capability information of an origination terminal has been updated, and determining whether to add first update indication information to a connection request message for a first service;

transmitting, by the origination terminal, the connection request message to a reception terminal;

selectively performing, by the reception terminal, a procedure for establishing a second service connection with the origination terminal or a procedure for checking terminal capability information with the origination terminal according to existence or non-existence of the first update indication information in the connection request message;

checking, by the origination terminal, whether the second update indication information of the reception terminal is included in a connection response message transmitted from the reception terminal; and selectively performing, by the origination terminal, the second service connection setting procedure with the reception terminal and the terminal capability information checking procedure with the reception terminal according to whether or not the second update indication information is included in the connection response message.

18. The method of claim 17, wherein the second update indication information indicates that the terminal capability information of the reception terminal has been updated from its terminal capability information in the previous service connection with the origination terminal.

19. The method of claim 17, wherein when the second update indication information has been added in the connection response message, the origination terminal performs the terminal capability information checking procedure with the reception terminal, wherein the terminal capability information checking procedure comprises:

transmitting, by the origination terminal, an OPTIONS message for requesting the terminal capability information of the reception terminal; and adding, by the reception terminal, its terminal capability information in a response message and transmitting the response message to the origination terminal.

20. The method of claim 17, wherein when the second update indication information has not been added to the connection response message, the origination terminal performs the procedure for setting the second service connection with the reception terminal.

* * * * *